United States Patent
Altaparmakov

(10) Patent No.: US 10,614,044 B2
(45) Date of Patent: Apr. 7, 2020

(54) SYSTEMS AND METHODS FOR PERFORMING DATA OBJECT RENAMING OPERATIONS

(71) Applicant: Tuxera Inc., Espoo (FI)

(72) Inventor: Anton Ivanov Altaparmakov, Great Chesterford (GB)

(73) Assignee: Tuxera, Inc., Espoo (FI)

( * ) Notice: Subject to any disclaimer, the term of this patent is extended or adjusted under 35 U.S.C. 154(b) by 195 days.

(21) Appl. No.: 15/641,922

(22) Filed: Jul. 5, 2017

(65) Prior Publication Data
US 2018/0011872 A1  Jan. 11, 2018

Related U.S. Application Data

(60) Provisional application No. 62/359,562, filed on Jul. 7, 2016.

(51) Int. Cl.
| | | |
|---|---|---|
| *G06F 16/20* | (2019.01) | |
| *G06F 16/178* | (2019.01) | |
| *G06F 16/11* | (2019.01) | |
| *G06F 16/23* | (2019.01) | |
| *G06F 16/16* | (2019.01) | |

(52) U.S. Cl.
CPC .......... *G06F 16/178* (2019.01); *G06F 16/122* (2019.01); *G06F 16/16* (2019.01); *G06F 16/2365* (2019.01)

(58) Field of Classification Search
None
See application file for complete search history.

(56) References Cited

U.S. PATENT DOCUMENTS

| | | |
|---|---|---|
| 2004/0193564 A1 | 9/2004 | Ban et al. |
| 2007/0094312 A1 | 4/2007 | Sim-Tang |
| 2007/0198520 A1* | 8/2007 | McKenney ............. G06F 16/10 |
| 2008/0256138 A1 | 10/2008 | Sim-Tang |
| 2009/0164440 A1* | 6/2009 | Pudipeddi ........... G06F 11/1417 |
| 2009/0216815 A1* | 8/2009 | Braginsky ............... H04L 67/42 |
| 2011/0295804 A1* | 12/2011 | Erofeev ............. H04L 29/0854 |
| | | 707/634 |
| 2015/0347440 A1 | 12/2015 | Habouzit et al. |
| 2017/0177447 A1* | 6/2017 | Golander ............ G06F 16/1815 |

FOREIGN PATENT DOCUMENTS

WO    2006008911 A1    1/2006

OTHER PUBLICATIONS

International Search Report and Written Opinion for PCT/US2017/040967 dated Sep. 14, 2017, pp. 14.
Extended European Search Report, Application No. 17824918.1, dated Jan. 7, 2020.

* cited by examiner

*Primary Examiner* — Belix M Ortiz Ditren
(74) *Attorney, Agent, or Firm* — J. Fish Law, PLLC

(57) ABSTRACT

This disclosure describes techniques performing data object renaming operations. This disclosure describes techniques for performing data object renaming operations in a manner that may reduce file system corruption and data loss. The techniques described herein may include selectively journaling particular types of renaming operations. Selectively journaling particular types of renaming operations may mitigate potential data loss and file system corruption.

20 Claims, 14 Drawing Sheets

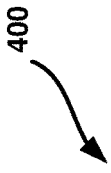

| DIRECTORY ENTRY RECORD 402 | BYTE 0 | BYTE 1 | BYTE 2-3 | BYTE 4-5 | BYTE 6-7 | BYTE 8-24 | BYTE 25-31 |
|---|---|---|---|---|---|---|---|
| | TYPE | NO. OF 32 BYTES | CHECKSUM | DOS FILE FLAGS | RESERVED | TIME DATA | RESERVED |

| STREAM EXTENSION RECORD 404 | BYTE 0 | BYTE 1 | BYTE 2-3 | BYTE 4-5 | BYTE 6-7 | BYTE 8-15 | BYTE 16-19 | BYTE 20-23 | BYTE 24-31 |
|---|---|---|---|---|---|---|---|---|---|
| | TYPE | NO_FAT_CHAIN BIT | RESERVED NAME SIZE | NAME HASH | RESERVED | VALID DATA LENGTH | RESERVED | FIRST CLUSTER | DATA SIZE |

| FILE NAME EXTENSION RECORD(S) 406 | BYTE 0 | BYTE 1 | BYTE 2-31 |
|---|---|---|---|
| | TYPE | RESERVED | FILE NAME |

FIG. 4A

| DIRECTORY ENTRY RECORD 452 | BYTE 0-10 | BYTE 11 | BYTE 12 | BYTE 13-19 | BYTE 20-21 | BYTE 22-25 | BYTE 26-27 | BYTE 28-31 |
|---|---|---|---|---|---|---|---|---|
| | NAME | DOS FILE FLAGS | DOS NAME FLAGS | TIME DATA | FAT12/16: ALWAYS 0 FAT32: HIGH 16-BITS OF FIRST CLUSTER | TIME DATA | LOW 16-BITS OF FIRST CLUSTER | FILE SIZE |

| LONG NAME DIRECTORY ENTRY RECORD(S) 454 | BYTE 0 | BYTE 1-10 | BYTE 11 | BYTE 12 | BYTE 13 | BYTE 14-25 | BYTE 26-27 | BYTE 28-31 |
|---|---|---|---|---|---|---|---|---|
| | ORDINAL | LONGNAME CHAR 1-5 | DOS FILE FLAGS | ZERO | CHECKSUM OF NAME | LONGNAME CHAR 6-11 | ZERO | LONGNAME CHAR 12-13 |

```
RENAMING JOURNAL
CHECKSUM: 1234X

JOURNAL ENTRY 1
ROOT\PICTURES\VACATIONS\X_MAS_VACATION.JPG

OFFSET: SECTOR 0: 1
NUMBER OF SLOTS: 3

TO

ROOT\PICTURES\HOLIDAYS\X_MAS_VACATION.JPG

OFFSET: SECTOR 63: 12
NUMBER OF SLOTS: 3

COMPLETED? FALSE
```

FIG. 10A

| RENAMING JOURNAL |
|---|
| CHECKSUM: 1234X |
| |
| JOURNAL ENTRY 1 |
| ROOT\PICTURES\VACATIONS\PIC_A.JPG |
| |
| OFFSET: SECTOR 0: 1 |
| NUMBER OF SLOTS: 2 |
| |
| TO |
| |
| ROOT\PICTURES\VACATIONS\X_MAS_VACATION.JPG |
| |
| OFFSET: SECTOR 2: 12 |
| NUMBER OF SLOTS: 3 |
| |
| COMPLETED? TRUE |
| |
| |
| JOURNAL ENTRY 2 |
| ROOT\PICTURES\VACATIONS\X_MAS_VACATION.JPG |
| |
| OFFSET: SECTOR 0: 1 |
| NUMBER OF SLOTS: 3 |
| |
| TO |
| |
| ROOT\PICTURES\HOLIDAYS\X_MAS_VACATION.JPG |
| |
| OFFSET: SECTOR 63: 12 |
| NUMBER OF SLOTS: 3 |
| |
| COMPLETED? FALSE |

FIG. 10B

SYSTEMS AND METHODS FOR PERFORMING DATA OBJECT RENAMING OPERATIONS

RELATED APPLICATIONS

This application claims the benefit of U.S. Provisional Application No. 62/359,562, filed on Jul. 7, 2016, which is incorporated by reference in its entirety.

TECHNICAL FIELD

This disclosure relates to systems and methods for use with file systems and more particularly to techniques for performing data object renaming operations.

BACKGROUND

Devices including laptop or desktop computers, tablet computers, televisions, digital video recorders, set-top boxes, digital media players, video gaming devices, and cellular telephones may utilize file systems to control how data is stored on and retrieved from a computer readable medium. For example, a device may read and/or write data to a storage device, such as, a memory card (e.g., a Secure Digital (SD) memory card, including Standard-Capacity (SDSC), High-Capacity (SDHC), and eXtended-Capacity (SDXC) formats), a hard disk drive, and/or a solid state drive including a Universal Serial Bus (USB) solid state drive (so-called "flash," "thumb," or "jump" drives) according to a defined file system. Types of file systems include, for example, file systems based on the Extended File System (ext), file systems based on the Hierarchical File System (HFS), file systems based on the XFS file system, file systems based on the Z File System (ZFS), file systems based on the New Technology File System (NTFS), and file systems based on File Allocation Table (FAT) file systems, including the FAT12, FAT16, FAT32, exFAT, and transactional exFAT file systems. Respective data objects (e.g., files) may be stored to a storage device within a volume.

Users of devices do not always unmount a volume before powering down a computing device or removing a storage device. Further, a storage device can may accidentally be removed from a computing device or a computing device may run out of battery power during operation.

SUMMARY

In general, this disclosure describes techniques for performing data object renaming operations. In particular, this disclosure describes techniques for performing data object renaming operations in a manner that may reduce file system corruption and/or data loss. It should be noted that incorporation by reference of documents herein is for descriptive purposes and should not be construed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative According to one example of the disclosure, a method for renaming a data object comprises determining whether a renaming operation can be performed in an atomic manner, creating a journal entry for the renaming operation only if the renaming operation is to be performed in a non-atomic manner, and updating the journal entry upon completing the renaming operation.

According to another example of the disclosure, a device for renaming a data object comprises one or more processors configured to determine whether a renaming operation can be performed in an atomic manner, create a journal entry for the renaming operation only if the renaming operation is to be performed in a non-atomic manner, and update the journal entry upon completing the renaming operation.

According to another example of the disclosure, a non-transitory computer-readable storage medium comprises instructions stored thereon, that upon execution, cause one or more processors of a device to determine whether a renaming operation can be performed in an atomic manner, create a journal entry for the renaming operation only if the renaming operation is to be performed in a non-atomic manner, and update the journal entry upon completing the renaming operation.

According to another example of the disclosure, an apparatus comprises means for determining whether a renaming operation can be performed in an atomic manner, means for creating a journal entry for the renaming operation only if the renaming operation is to be performed in a non-atomic manner, and means for updating the journal entry upon completing the renaming operation.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4B are conceptual diagrams illustrating examples of directory entries that include records associated with a data object according to one or more techniques of this disclosure.

FIGS. 10A-10B are conceptual diagrams illustrating examples renaming journals generated according to one or more techniques of this disclosure.

DETAILED DESCRIPTION

Figure 1:
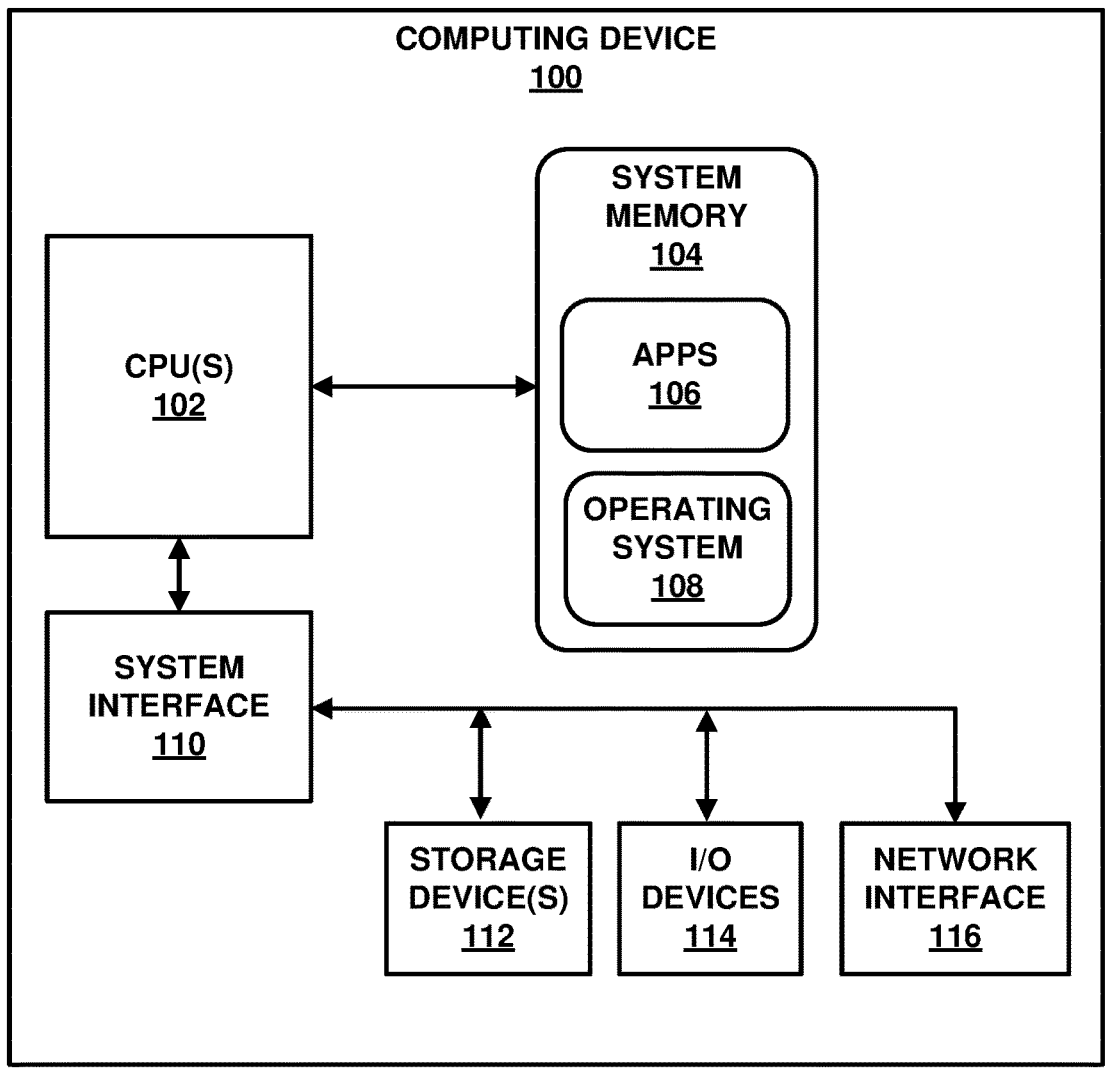
FIG. 1 is a block diagram illustrating an example of a computing device that may implement one or more techniques of this disclosure.

In general, this disclosure describes techniques for performing data object renaming operations. In particular, this disclosure describes techniques for performing data object renaming operations in a manner that may reduce file system corruption and/or data loss. Failures, such as, spontaneous power loss and/or unexpected storage device disconnections may occur during renaming operations. In some cases, a failure during renaming operations may lead to loss of the data object being renamed (or potentially duplication of the data object) which may lead to file system corruption and/or data loss. The techniques described herein may include selectively journaling particular types of renaming operations, such that when a volume is subsequently mounted after a failure, potential corruption and/or data loss may be mitigated. In one example, in some cases, non-committed transactions associated with renaming operations may be replayed or undone depending on a volume state. As described in further detail below, selectively journaling particular types of renaming operations may mitigate potential data loss and/or file system corruption while maintaining acceptable system performance.

User data may be arranged, organized, and/or managed on a storage device according to a defined file system. For example, the Microsoft Extensible Firmware Initiative FAT32 File System Specification (version 1.03 Dec. 6, 2000), which is incorporated by reference in its entirety, defines aspects of the FAT32 file system and Microsoft exFAT Revision 1.00 File System Basic Specification (fourth release, 1 Jan. 2009), which is described in Appendix A of U.S. Pat. No. 8,321,439, and which is incorporated by reference in its entirety, defines aspects of the exFAT file system. Further, file systems may include other proprietary file systems. A file system may specify the structure and requirements of a volume, where a volume is a set of logical structures defined for a data space necessary to store and retrieve user data. As described in detail below with respect to FIG. 3, a volume may include boot record(s), file allocation table(s), allocation bitmaps, and user data. User data may include directories and files, and/or similar data structures. Each of a directory, file, and/or similar data structures may generally be referred to as a data object or data item. In Unix based file systems, the term Mode may be used to refer to a file or a directory data object. As used herein the term Mode may more generally refer to a data object associated with user data.

User data may be physically stored to one or more sectors of a storage device. File systems may define a cluster (or allocation unit) according to a number of sectors, where a cluster is the smallest logical unit of memory that can be allocated to a data object. Thus, one or more clusters are allocated to each data object stored on a storage device. File allocation table(s), allocation bitmap(s), and/or similar logical structures within a file system provide a mapping of data objects to one or more allocated clusters, and as such may be referred to as allocation mapping structures. As described in further detail below, file system drivers may allow an application and/or processes associated with an application to cause data objects to be modified on a storage device. For example, modifying a data object may include creating, adding additional data to, removing data from, moving a file to another directory, renaming a file, or deleting a file. Modifying a data object may include allocating additional clusters to a data object or deallocating clusters from a data object. File allocation table(s), allocation bitmap(s), and similar logical structures within a file system may be updated as the allocation of clusters to a data object changes. Further, modifying a data object may include modifying one or more sectors. That is, modifying a data object may include writing values of data to sectors corresponding to a cluster allocated to a data object (e.g., overwriting a sector). Modifications of a data object that only require modifying a single sector are referred to as atomic (e.g., single sector writes are considered to be atomic) and modifications of a data object that require modifying more than one sector are referred to as non-atomic.

As described in further detail below, a directory table (which may also be referred to as a directory or a folder) is a type of data object that includes entry records corresponding to other data objects (e.g., files and/or sub-directories). In some cases, when a file within a directory is renamed, entry records of a directory table are modified. For example, if a user increases the number of characters in a file name (e.g., from 10 to 20) one or more additional entry records may be added to a directory table. In some cases, adding additional entry records to a directory table may include overwriting data in a single sector. In some cases, adding additional entry records to a directory table may include writing data to additional sectors. Further, in some cases, removing entry records from a directory table (e.g., in response to shortening a file name) may include writing data to one or more sectors. Thus, in some cases, data object renaming operations may be atomic and in other cases data object renaming operations may be non-atomic. Further, it should be noted that for some file systems, moving a file from one directory to another directory, which may be considered a renaming operation, may be inherently non-atomic. That is, moving a file from one directory to another directory (each of which may be distinct data objects having respectively allocated clusters) may requiring deleting entries corresponding the file at a disk location corresponding to an origin (or home) directory and writing entries corresponding the file at a disk location corresponding to a destination directory.

As described in further detail below, according to the techniques describe herein, in one example, renaming operations may be selectively journaled based on whether they can be performed atomically. It should be noted that in other examples, the techniques described herein may more generally selectively journal renaming operations, and/or other data object modifications, based on the number of sectors that are required to be modified to complete the operation. For example, in one example, journaling may occur for operations requiring a minimum of number sectors to be modified (e.g., operations requiring at least three sectors to be modified may be journaled). As described above, a journal may allow non-committed transactions associated with renaming operations to be replayed or undone depending on a volume state, which may reduce data loss and/or data corruption.

It should be noted that some file systems include defined journals (e.g., Extended File Systems and the XFS file systems) and other file systems do not include defined journals (e.g., FAT16, FAT32, and exFAT). In some cases, the techniques described herein may be particular useful for file systems that do not include defined journals. Further, it should be noted that defined journals typically journal all operations, i.e., journaling occurs regardless of whether a particular operation is atomic or non-atomic. It should be noted that excessive journaling may slow down performance of a device (e.g., other operations may need to wait for journaling operations to be performed) and in some cases may reduce the lifetime of a memory device (e.g., flash based memory devices may have a finite write-cycle count before failure). Thus, selectively journaling renaming operations according to the techniques described herein may mitigate potential data loss and/or file system corruption while achieving good performance and without significantly reducing the lifetime of a memory device. That is, the techniques described herein may reduce write amplification compared to defined file system journaling techniques.

FIG. 1 is a block diagram illustrating an example of a computing device that may implement one or more techniques of this disclosure. Computing device 100 may include one or more processors and a plurality of internal and/or external storage devices. Examples of storage devices include file servers, File Transfer Protocol (FTP) servers, network attached storage (NAS) devices, a local disk drive, removable memory devices, such as, for example, memory cards and USB memory devices, or any other type of device or storage medium capable of storing data. A storage medium may include an optical storage medium (e.g., DVDs, CD-ROMs, etc.), a magnetic storage medium, a flash memory, or any other suitable digital storage media. When the techniques described herein are implemented partially in software, a device may store instructions for the software in a suitable, non-transitory computer-readable medium and execute the instructions in hardware using one or more processors.

Computing device 100 is an example a computing device configured to store data on or retrieve data from a computer readable medium. Data may include, for example, application files, document files, media files (audio and/or video files), and the like. Computing device 100 may be equipped for wired and/or wireless communications and may include devices, such as, for example, desktop or laptop computers, mobile devices, smartphones, cellular telephones, tablet devices, set top boxes, DVRs, surveillance systems, personal gaming devices, and automotive infotainment systems. As illustrated in FIG. 1, computing device 100 includes central processor unit(s) 102, system memory 104, system interface 110, storage device(s) 112, input/output (I/O) device(s) 114, and network interface 116. As illustrated in FIG. 1, system memory 104 includes applications (apps) 106 and operating system 108. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

Central processing unit(s) 102 may be configured to implement functionality and/or process instructions for execution in computing device 100. Central processing unit(s) 102 may be capable of retrieving and processing instructions, code, and/or data structures for implementing one or more of the techniques described herein. Instructions may be stored on a computer readable medium, such as system memory 104 or storage device(s) 112. Central processing unit(s) 102 may include digital signal processors (DSPs), general purpose microprocessors, application specific integrated circuits (ASICs), field programmable logic arrays (FPGAs), or other equivalent integrated or discrete logic circuitry. Central processing unit(s) 102 may include one or more multi-core central processing units. Central processing unit(s) 102 may operate according to a page size, where a page includes a fixed-length contiguous block of virtual memory. A common page size for central processing unit architectures is 4096 bytes (i.e., 4 kilobytes (kiB)). Other example page sizes may include 8 kiB, 16 kiB, 32 kiB, 64 kiB, etc.

System memory 104 may be configured to store information that may be used by computing device 100 during operation. System memory 104 may be described as a non-transitory or tangible computer-readable storage medium. In some examples, system memory 104 may provide temporary memory and/or long-term storage. In some examples, system memory 104 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. In one example, system memory 104 may include an internal hard disk drive and/or an internal flash memory.

System interface 110 may be configured to enable communications between components of computing device 100. In one example, system interface 110 comprises structures that enable data to be transferred from one peer device to another peer device or to a storage medium. For example, system interface 110 may include a chipset supporting Peripheral Component Interconnect (PCI), Peripheral Component Interconnect Express (PCIe) bus protocols, proprietary bus protocols, or any other form of structure that may be used to interconnect peer devices.

Storage device(s) 112 represent memory of computing device 100 that may be configured to store different amounts of information for different periods of time than system memory 104. Similar to system memory 104, storage device(s) 112 may also include one or more non-transitory or tangible computer-readable storage media. Storage device(s) 112 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive. Data stored on storage device(s) 112 may be stored according to a defined file system, such as, for example FAT12, FAT16, FAT32, exFAT, transactional exFAT, NTFS, and/or proprietary file systems.

I/O device(s) 114 may be configured to receive input and provide output for computing device 100. Input may be generated from an input device, such as, for example, a touch-sensitive screen, a track pad, a track point, a mouse, a keyboard, a microphone, one or more video cameras, or any other type of device configured to receive input. Output may be provided to output devices, such as, for example, speakers or a display device. In some examples, I/O device(s) 114 may be external to computing device 100 and may be operatively coupled to computing device 100 using a standardized communication protocol, such as for example, Universal Serial Bus protocol (USB).

Network interface 116 may be configured to enable computing device 100 to communicate with external computing devices via one or more networks. Network interface 116 may be a network interface card, such as an Ethernet card, an optical transceiver, a radio frequency transceiver, or any other type of device that can send and receive information.

Network interface 116 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 1, system memory 104 includes applications 106 and operating system 108. Applications 106 may include any applications implemented within or executed by computing device 100 and may be implemented or contained within, operable by, executed by, and/or be operatively/communicatively coupled to components of computing device 100. Applications 106 may include instructions that may cause central processing unit(s) 102 of computing device 100 to perform particular functions. Applications 106 may cause central processing unit(s) 102 to write data to or read data from a computer readable medium, such as for example, system memory 104 and/or storage device(s) 112. Applications 106 may include algorithms which are expressed in computer programming statements, such as, for loops, while-loops, if-statements, do-loops, etc.

As further illustrated in FIG. 1, applications 106 may execute on top of operating system 108. Operating system 108 may be configured to facilitate the interaction of applications 106 with central processing unit(s) 102, and other hardware components of computing device 100. Operating system 108 may be an operating system designed to be installed on laptops and desktops. For example, operating system 108 may be a Windows® operating system, Linux, or Mac OS. Operating system 108 may be an operating system designed to be installed on smartphones, tablets, set-top boxes, and/or gaming devices. For example, operating system 108 may be a Windows®, Linux, Mac OS, Android, iOS, Windows Mobile®, or a Windows Phone® operating system. It should be noted that although techniques may be described according to particular example operating systems, the techniques described herein are not limited to a particular operating system.

Figure 2:
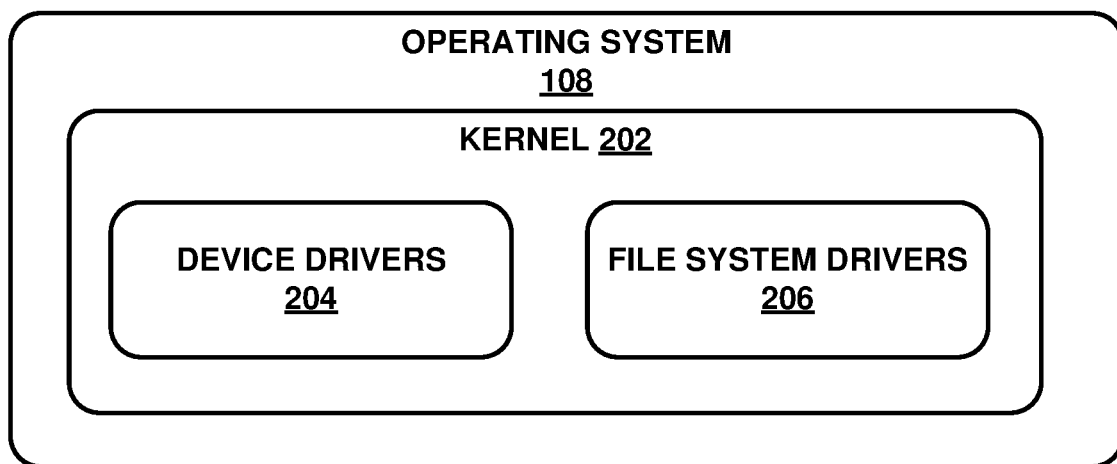
FIG. 2 is a block diagram illustrating an example of an operating system of a computing device that may implement one or more techniques of this disclosure.

FIG. 2 is a block diagram illustrating an example of an operating system of a computing device that may implement one or more techniques of this disclosure. As illustrated in FIG. 2, operating system 108 includes kernel 202. In one example, kernel 202 may be a kernel based on a Linux kernel. In other examples, kernel 202 may be a component or subset of instructions of an operating system. As illustrated in FIG. 2, kernel includes device drivers 204 and file system drivers 206. Device drivers 204 may be configured to operate as an interface between operating system 108 and hardware devices, such as, for example, system interface 110. File system drivers 206 may be configured to provide a layer of abstraction between applications 106 and/or operating system 108 and a storage device, such as, for example system memory 104 and/or storage device(s) 112. For example, file system drivers 206 may allow an application to modify a data object (e.g., in response to user input) on storage device(s) 112 without requiring the application to perform aspects of file management. Modifying a data object may include any type of data change within a volume, from creating, modifying, renaming, moving, or deleting a file to creating, modifying, renaming, moving, or deleting a directory. As described in detail below, modifying a data object may include modifying a boot record, modifying directory entries, modifying a file allocation table, modifying an allocation bitmap, allocating clusters, and/or deallocating clusters. In one example, file system drivers 206 may be configured to allow data to be stored to system memory 104 and/or storage device(s) 112 according to a file system based on a File Allocation Table (FAT) file system, including FAT12, FAT16, FAT32, exFAT, transactional exFAT, NTFS, and/or proprietary file systems. It should be noted that in some examples, file system drivers 206 may be implemented as one driver binary that implements multiple file systems (e.g., both FAT and exFAT file systems). In other examples, file system drivers 206 may include a separate binary driver for respective file systems.

Figure 3:
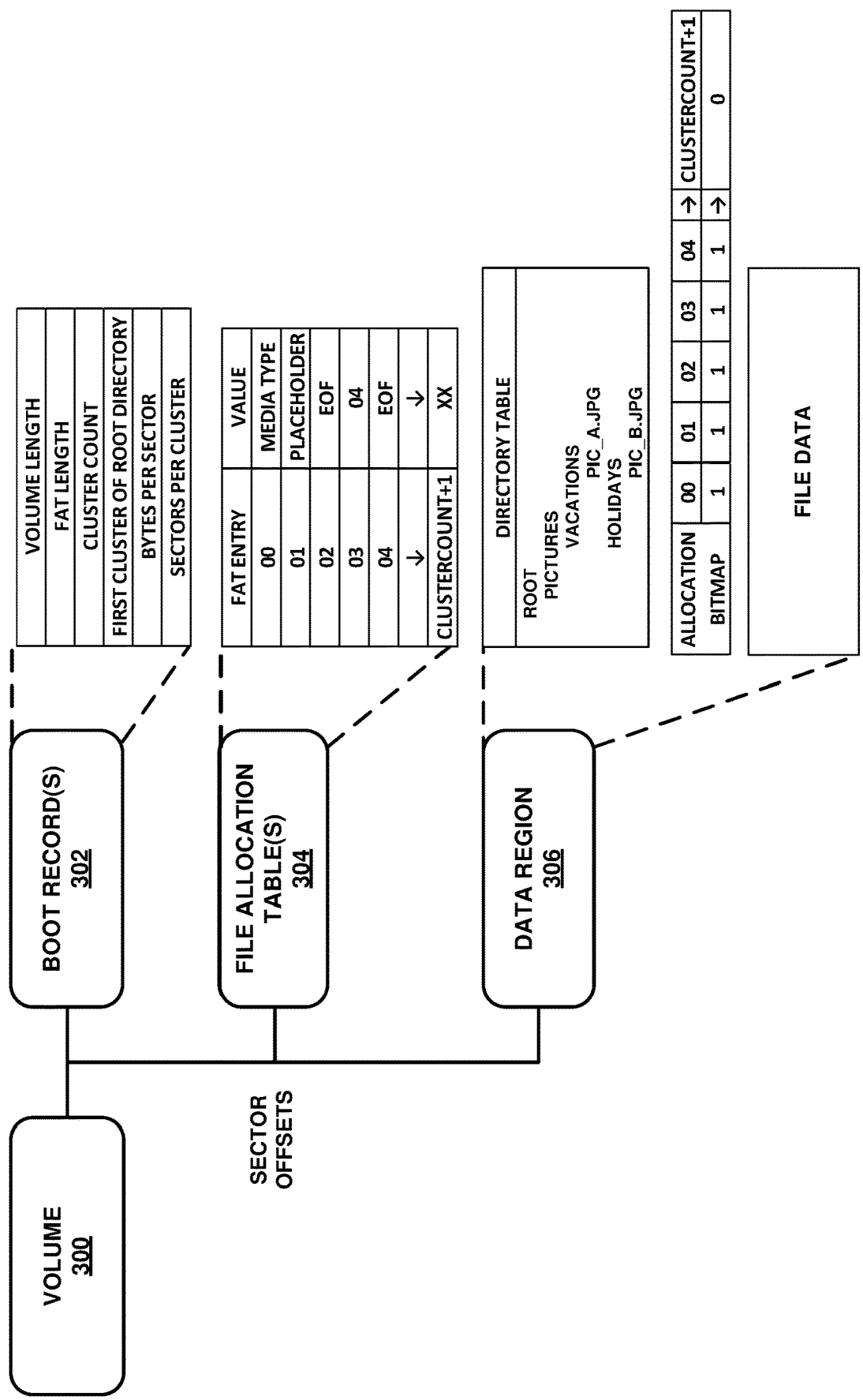
FIG. 3 is a conceptual diagram illustrating an example of a volume defined according to an example file system according to one or more techniques of this disclosure.

FIG. 3 is a conceptual diagram illustrating an example of a volume defined according to an example file system. In one example, volume 300 may be defined according to a FAT file system (e.g., FAT12, FAT16, FAT32, and exFAT). It should be noted that although in some examples volume 300 is described with respect to a FAT file system, the techniques described herein are not limited to an FAT file systems and may be used with other file systems, including, for example, proprietary file systems. Further, it should be noted that example volume 300 represents an illustrative example of a volume and, for the sake of brevity, is not intended as an exhaustive description of a volume defined according to a file system. Additional details of a volume may be found in a corresponding file system specification. For example, in the case where volume 300 is defined according to a file system based on the exFAT file system, additional details of volume 300 may be found in the Microsoft exFAT Revision 1.00 File System Basic Specification (fourth release, 1 Jan. 2009). In the case where volume 300 is defined according to a file system based on the one or more of the FAT12, FAT16, and FAT32 file systems, additional details of volume may be found in the Microsoft Extensible Firmware Initiative FAT32 File System Specification (version 1.03 Dec. 6, 2000).

In the example illustrated in FIG. 3, volume 300 includes boot record(s) 302, file allocation table(s) 304, and data region 306. Each of boot record(s) 302, file allocation table(s) 304, and data region 306 may be addressable on a storage device, such as, and for example, storage device(s) 112, according to a sector value. Boot record(s) 302 include data entries describing file system parameters. In one example, boot record(s) 302 include data for bootstrapping the volume, fundamental file system parameters for the volume, and various error checking information. Boot record(s) 302 may include one or more boot records. In one example, boot record(s) 302 include a primary boot record and a backup boot record, where the backup boot record is a replica of the primary boot record. As illustrated in FIG. 3, examples of information included in boot record(s) 302 include volume length, file allocation table length, cluster count, first cluster of root directory, bytes per sector, and sectors per cluster. In one example, volume length specifies the size of the volume 300 in sectors. In one example, file allocation table length specifies the size of a file allocation table 304 in sectors. In one example, cluster count specifies the number of clusters included in data region 306. It should be noted that although not illustrated in FIG. 3, boot record(s) 302 may also include information indicating a percentage of clusters which are allocated and information that allows volume 300 to be boot-strapped. As described in detail below, boot record(s) 302 may be updated as files and directories are modified. In one example, first cluster of root directory specifies a sector location of the root directory in data region 306.

In one example, bytes per sector specifies the number of bytes included in a sector. In one example, the number of bytes per sector may be expressed in power of 2 notation and may range from a minimum of 512 bytes per sector to a maximum of 4096 bytes per sector. In one example, sectors per cluster specifies the number of sectors per cluster. In one example, the minimum number of sectors per cluster may be one and the maximum number of sectors per cluster may provide for a maximum cluster size of 32 kiB. It should be noted that, in some examples, the size of a cluster may be dependent on the volume size. For example, for standard compliant FAT volumes for the largest volumes, defined as volumes greater than 32 Gigibytes (GiB) (where 1 GiB is $1,024^3$ bytes), the cluster size would be the maximum cluster size for FAT, which is 32 kiB (e.g., 64 sectors of 512 bytes or 8 sectors of 4096 bytes). A standard compliant 32 GiB FAT volume would use clusters having a size of 16 kiB. A standard compliant 16 GiB FAT volume would use 8 kiB clusters. A standard compliant 8 GiB FAT volume would use 4 kiB clusters.

File allocation table(s) 304 may include one or more file allocation tables. In one example, file allocation table(s) 304 includes a single file allocation table 304. In another example, file allocation table(s) 304 includes two or more file allocation tables. File allocation table(s) 304 may be used to describe a sequence of clusters (also, referred to as a chain of clusters) that are allocated to a data object, such as a file, in data region 306. As illustrated in FIG. 3, a file allocation table may include an entry and a value corresponding to the entry. In the example illustrated in FIG. 3, entry 00 includes a value indicating a media type and entry 01 includes a placeholder value. Entries 02 through ClusterCount+1 may provide information describing sequences of clusters allocated to a data object. In one example, entries may include a value indicating a subsequent cluster entry in a sequence of clusters, a value indicating a "bad" cluster, a value indicating that the cluster is not in use, or a value indicating the end of a sequence of clusters (EOF).

In the example illustrated in FIG. 3, root file directory begins at cluster 02. As illustrated in FIG. 3, entry 02 includes an EOF marker which indicates that the root directory is not assigned any additional clusters. As illustrated in FIG. 3, entry 03 includes an address of 04, indicating that the next cluster in the sequence for the data object is cluster 04. Entry 04 includes an EOF marker which indicates that the data object is not allocated any additional clusters. In this manner, file allocation table(s) may be used to identify a sequence of clusters allocated to a data object. It should be noted that although in the example illustrated in FIG. 3 that the clusters allocated to an data object are consecutive, in other examples, clusters allocated to an data object may include clusters that are not consecutive (e.g., entry 03 pointing to entry 07, etc.).

Data region 306 may be the region of volume 300 where data that makes up a data object is stored. In some examples, data region 306 may be referred to a cluster heap. Data region 306 may include data objects representing one or more types of files. For example, data region 306 may include a word processing document, such as, for example, a Microsoft Word document, media files, such as, for example, a JPEG file, video files, and/or other types of files. Further, as described in further detail below, data region 306 may include a journal (e.g., a journal file that may be hidden to a user) generated according to one or more of the techniques described herein. As described above, information regarding the configuration of data region 306 may be included in boot record(s) 302 (e.g., cluster count and percentage of clusters allocated). It should be noted that in most cases, boot record(s) 302 are typically updated on a mounting event. As further described above, a modification to a data object stored in data region 306 may require file allocation table(s) 304 to be updated. As illustrated in FIG. 3, data region includes directory table, allocation bitmap, and file data. As described above, a directory table may include entries describing a tree structure which indicates a relationship between files and directories. For example, directory table may indicate that a particular file is stored in a sub-directory of a parent directory.

In the example illustrated in FIG. 3, directory table includes a root directory, a "PICTURES" directory, and sub-directories "VACATIONS" and "HOLIDAYS." As further illustrated in FIG. 3, a picture file ("PIC_A.JPG") is included within the "VACATIONS" directory and a picture file ("PIC_B.JPG") is included within the "HOLIDAYS" directory. In the example illustrated in FIG. 3, the root directory may include general information about the volume and the data region, for example, the location of the allocation bitmap, when the volume includes an allocation bitmap. It should be noted that directory entries may include one or more records of different types (e.g., a directory entry record, a stream extension record, file name extension record(s), etc.) as defined according to a file system. One or more records may map a data object to a data region. For example, a first cluster field in a record may provide an initial mapping of a file to one or more clusters of data. As data objects stored to a volume are modified, the records may be updated.

Referring again to FIG. 3, allocation bitmap may maintain the allocation state of the clusters in data region 304 and may be used to determine which clusters in a volume are currently available to write to, i.e., not currently allocated. As illustrated in the example of FIG. 3, allocation bitmap includes an entry corresponding to each cluster of data region 306, where a binary value of "1" indicates that a particular cluster is allocated and a binary value of "0" indicates that a cluster is deallocated. It should be noted that although some file systems, such as, for example FAT12, FAT16, and FAT32 may not include an allocation bitmap, the techniques described herein may be used with file systems that include or do not include an allocation bitmap. It should be noted that in the example of exFAT, data region 306 may include an UP-case table that includes data for converting lower-case characters to upper case characters. For example, UP-case table may include an array of Unicode characters. In the example of exFAT, file names may be stored in a case insensitive manner and file names may be converted to upper-case during search operations. It should be noted that in the examples of FAT12, FAT16, and FAT32, data region 306 does not include UP-case table. File data may include data representing a file, such as, for example, PIC_A.JPG and PIC_B.JPG in the example of FIG. 3.

Figure 4B:
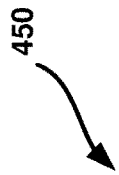

As described above, directory entries included in a directory table may include one or more records of different types. FIG. 4A and FIG. 4B are conceptual diagrams illustrating examples of directory entries that include records associated with a data object. Example directory entry 400 illustrated in FIG. 4A generally corresponds to a directory record defined according to exFAT. Example directory entry 450 illustrated in FIG. 4B generally corresponds to a directory record defined according to FAT12, FAT16, and FAT32. As illustrated in FIG. 4A, directory entry 400 includes directory entry record 402, stream extension record 404, and file name extension record(s) 406. Directory entry record 402, stream extension record 404, and file name extension record(s) 406 may be defined according to a file system specification, such as, for example, exFAT. In the example of exFAT, each record may be 32 bytes and may be generally formatted as illustrated in FIG. 4A. In the example of exFAT, the order of directory entry record 402, stream extension record 404, and file name extension record(s) 406 in one or more sectors may be as follows: directory entry record 402, stream extension record 404, and file name extension record(s) 406. It should be noted that example directory entry 400 represents an illustrative example of a directory entry defined according to a file system and, for the sake of brevity, an exhaustive description of a directory entry defined according to a file system is not provided herein. Additional details of a directory entry 400 may be found in a corresponding file system specification. For example, in the case where directory entry 400 is defined according to a file system based on the exFAT file system, additional details of directory entry 400 may be found in the Microsoft exFAT Revision 1.00 File System Basic Specification (fourth release, 1 Jan. 2009).

As illustrated in FIG. 4A, information describing a name of a data object, a first cluster of a data object, and the data size of an data object are included in directory entry 400. Directory entry record 402 includes DOS file flags and time data. In one example, DOS file flags may include information indicating whether a file is read-only file, a hidden file, a system file, or an archive file. Time data may include information indicating when a file has been created, accessed, and/or modified. Stream extension record 404 includes information identifying the first cluster of an Mode and the data size of the data object. File name extension record(s) 406 includes a type value and object identifying information, i.e., a file name Directory entry 400 may include one or more file name extension records. The number of file name extensions records may be based on the length of a file name. As described in further detail below, renaming a file may increase the number of file extensions for the file and as such may require data to be written to one or more sectors. As illustrated in FIG. 4A, directory entry record 402 and stream extension record 404 also include type values. In one example, each of the type values may include a bit indicating whether the data object has been deleted. In one example, setting a first bit of type value to 0 may indicate that a data object has been deleted. As described in further detail below, during a renaming operation type values in each of a directory entry record, stream extension record, and file extension record(s) may be updated to indicate that a data object was deleted. For example, when a data object is moved from an origin directory to a destination directory, a directory entry record, stream extension record, and file extension record(s) in the origin directory may have resulting type values that indicate that the data object was deleted from the directory.

Referring to FIG. 4B, directory entry 450 includes directory entry record 452 (which may be referred to as a short directory entry record) and may include one or more long name directory entry record(s) 454. Directory entry 450 may be defined according to a file system specification, such as, for example, FAT12, FAT16, and FAT32. In the example of FAT12, FAT16, and FAT32, the order of directory entry record 452 and one or more long name directory entry record(s) 454 in one or more sectors may be as follows: one or more long name directory entry record(s) 454 and directory entry record 452. In a similar manner to the number of file name extensions records 406, the number of long name directory entry record(s) 454 may be based on the length of a file name. As described in further detail below renaming a file may increase the number of long name directory entry records for the file and as such may require data to be written to one or more sectors. It should be noted that example directory entry 450 represents an illustrative example of a directory entry defined according to a file system and, for the sake of brevity, an exhaustive description of a directory entry record defined according to a file system is not provided herein. Additional details of a directory entry 450 may be found in a corresponding file system specification. For example, in the case where directory entry 450 is defined according to a file system based on the one or more of the FAT12, FAT16, and FAT32 file systems, additional details of the directory entry 450 may be found in the Microsoft Extensible Firmware Initiative FAT32 File System Specification (version 1.03 Dec. 6, 2000).

In a similar manner to that described above with respect to directory entry 400, values of directory entry 450 may indicate whether a data object has been deleted. In one example, the first byte of a directory entry record may be set to a default value indicating that a directory entry record is not in use, i.e., whether a slot within a sector is available. In one example, the default value may be hexadecimal value E5h. As described in further detail below, the first byte of a slot in a sector may be used to determine if a slot is free and if a renaming operation may be performed atomically.

As described above, operating system 108 and/or file system drivers 206 may be configured to store data to a storage device, such as storage device(s) 118 according to a volume defined by a file system specification. In one example, operating system 108 and/or file system drivers 206 may be configured to allocate clusters, deallocate clusters, create a data object, delete a data object, and/or rename a data object. As described above, operating system 108 and/or file system drivers 206 may be configured to cause data to be stored to a storage device according to a volume based on instructions received by one or more applications. In one example, operating system 108 and/or file system drivers 206 may be configured to perform renaming operations according to one or more of the techniques described herein. Further, operating system 108 and/or file system drivers 206 may further be configured to examine storage devices, such as, for example, storage device(s) 118, and correct errors. One way operating system 108 and/or file system drivers 206 may locate errors is by comparing a volume allocation bitmap with the disk sectors assigned to files in the file system. fsck is a command available in Linux that may be used to check and optionally repair a volume defined according to a file system. chkdsk is a command available in Windows® operating systems that may be used to check and optionally repair a volume defined according to a file system. As described in further detail below, operating system 108 and/or file system drivers 206 may locate and correct errors according to one or more of the techniques described herein.

Figure 5:
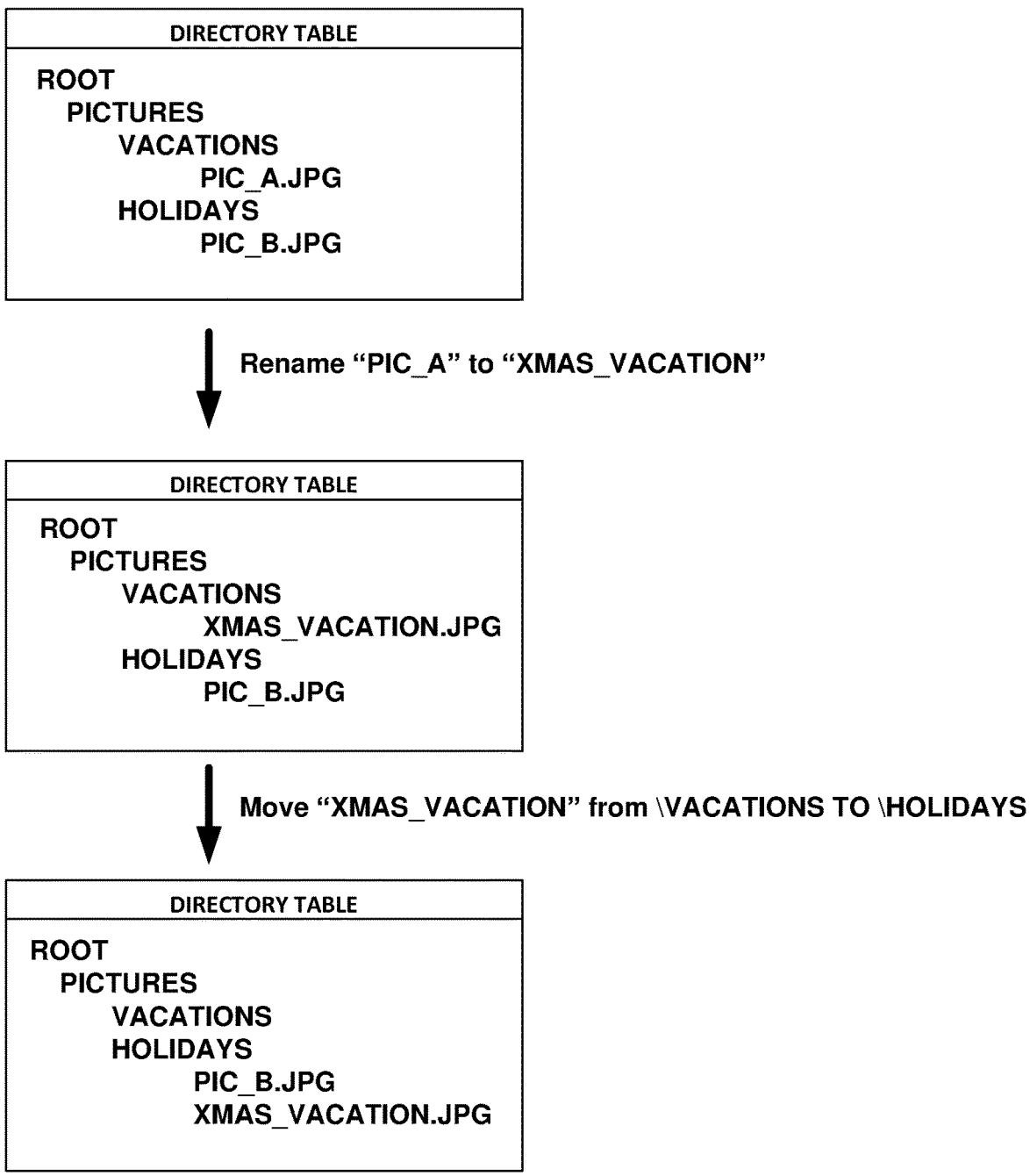
FIG. 5 is a conceptual diagram illustrating examples of renaming data objects according to one or more techniques of this disclosure.
Figure 6:
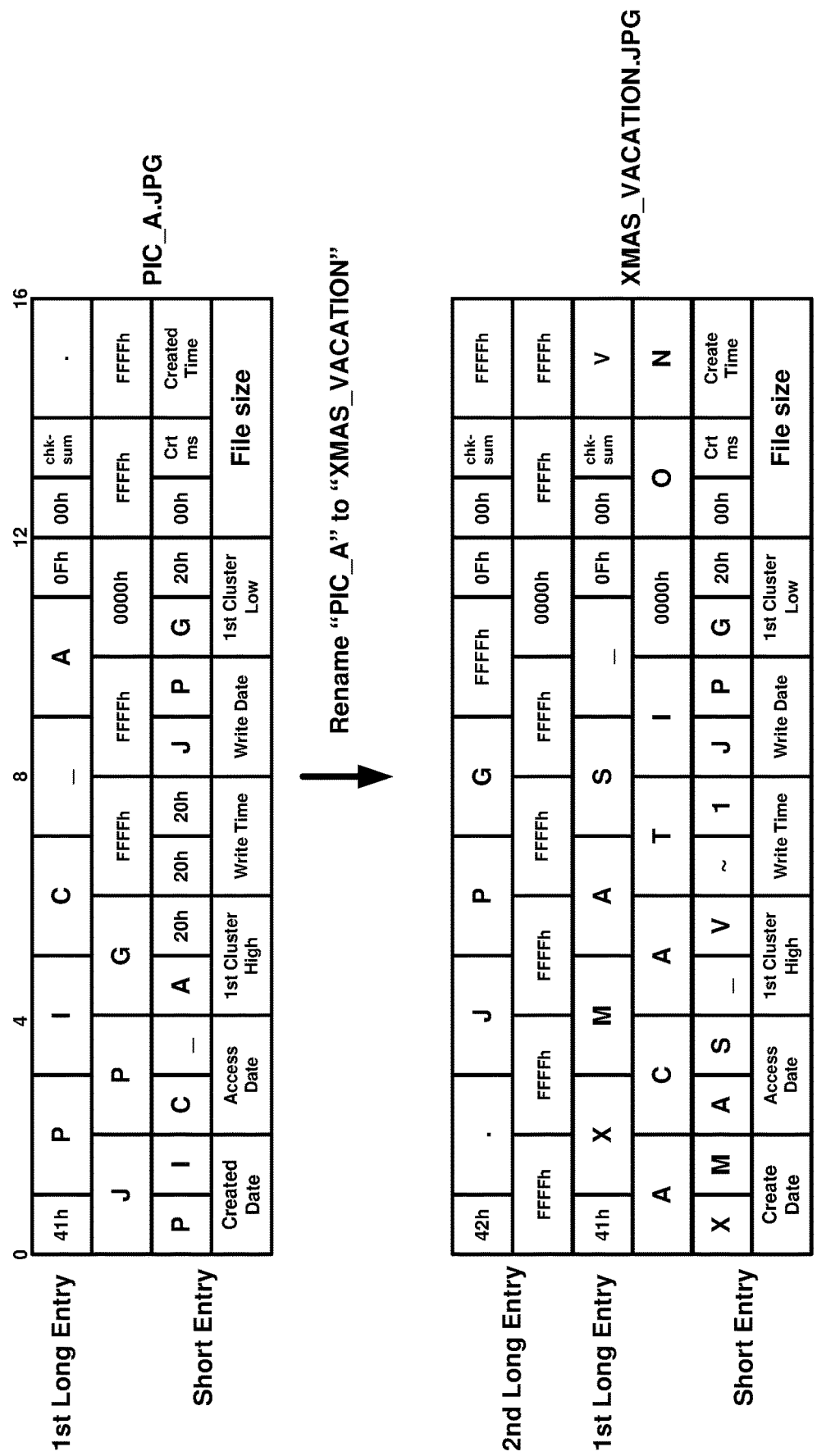
FIG. 6 is a conceptual diagram illustrating an example of how renaming a data object may cause changes to occur to records associated with a data object according to one or more techniques of this disclosure.
Figure 8:
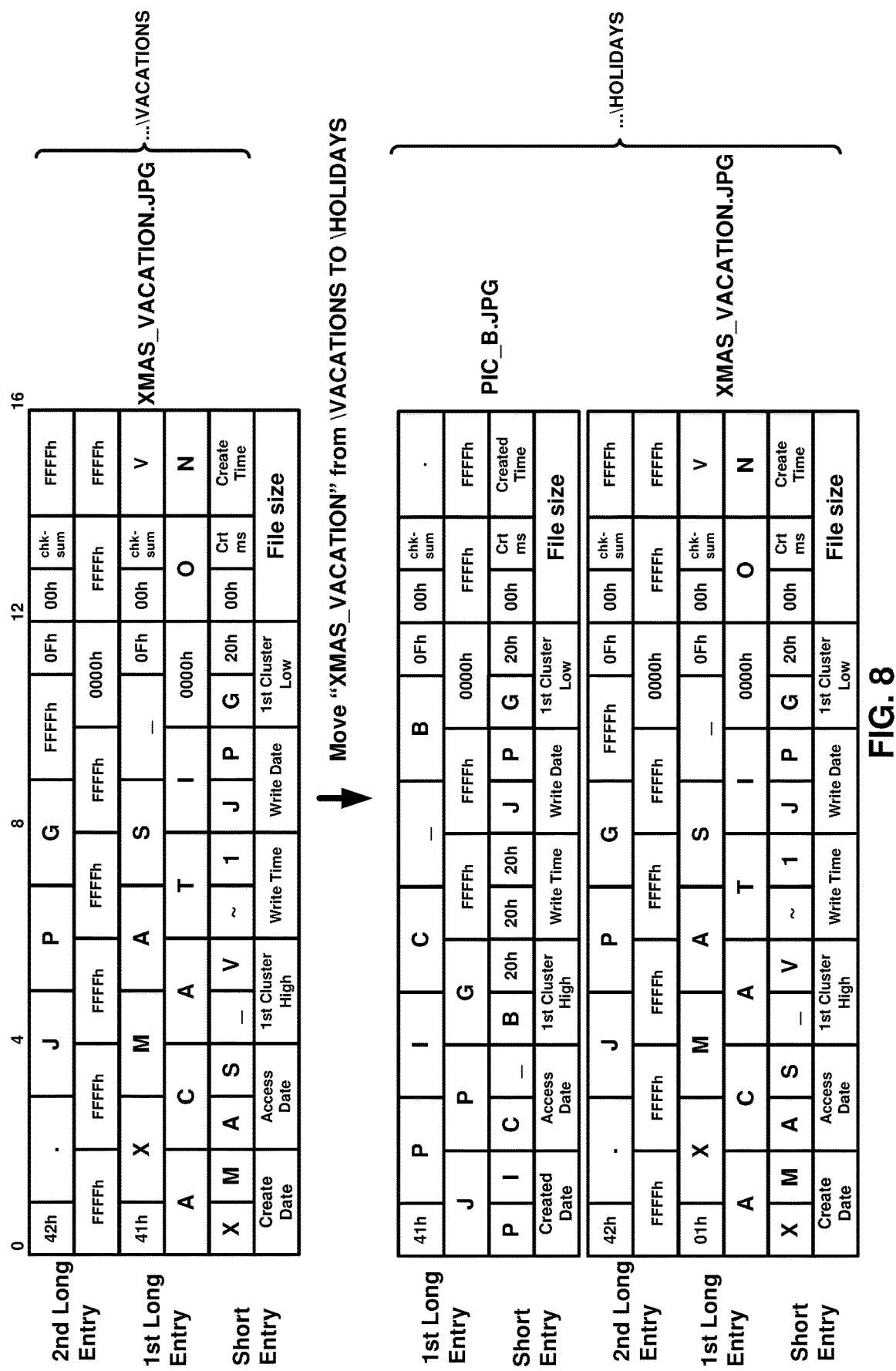
FIG. 8 is a conceptual diagram illustrating an example of how renaming a data object may cause changes to occur to records associated with a data object according to one or more techniques of this disclosure.

FIG. 5 is a conceptual diagram illustrating examples of renaming a data object. In the example illustrated in FIG. 5, a user renames a file "PIC_A.JPG" to "XMAS_VACATION.JPG" and subsequently moves the renamed file "XMAS_VACATION.JPG" from directory "VACATIONS" to directory "HOLIDAYS." As described above, moving a file from one directory to another may be considered a renaming operation. FIG. 6 is a conceptual diagram illustrating an example of how renaming a file from "PIC_A.JPG" to "XMAS_VACATION.JPG" may cause additional directory entries to be created in directory "VACATIONS." That is, in the example of FIG. 6, renaming a file from "PIC_A.JPG" to "XMAS_VACATION.JPG" causes an additional long entry to be required to contain the file name. As described above, changing the number of an additional directory entries may be atomic in some cases and may be non-atomic in other cases. FIG. 8 is a conceptual diagram illustrating an example of how moving the file "XMAS_VACATION.JPG" from directory "VACATIONS" to directory "HOLIDAYS" may cause additional directory entries to be created in directory "HOLIDAYS." As described above, moving a file from one directory to another may be non-atomic. It should be noted that with respect to FIG. 6 and FIG. 8, the directory entries may generally correspond to directory entries defined according to the FAT12, FAT16, and FAT32 file systems. It should be noted that for the sake of brevity, a complete description of the values in the directory entries in FIG. 6 and FIG. 8 is not provided herein. Further, it should be noted that the techniques described herein may be applicable to exFAT file systems and may be generally applicable to file systems where a renaming operation may change a number of memory units used to describe a data object.

Figure 7A:
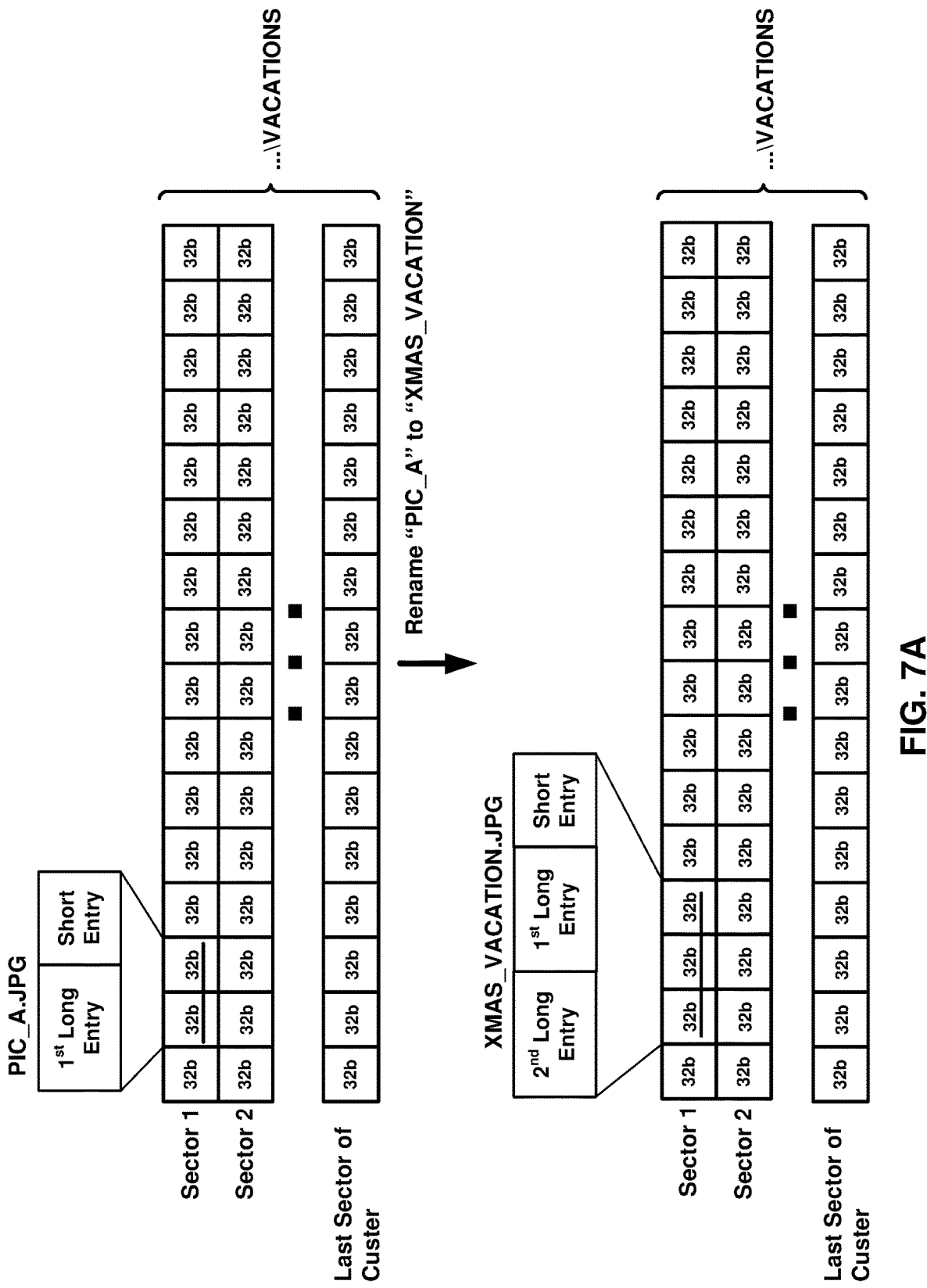
FIGS. 7A-7B are conceptual diagrams illustrating examples of renaming a data object according to one or more techniques of this disclosure.
Figure 7B:
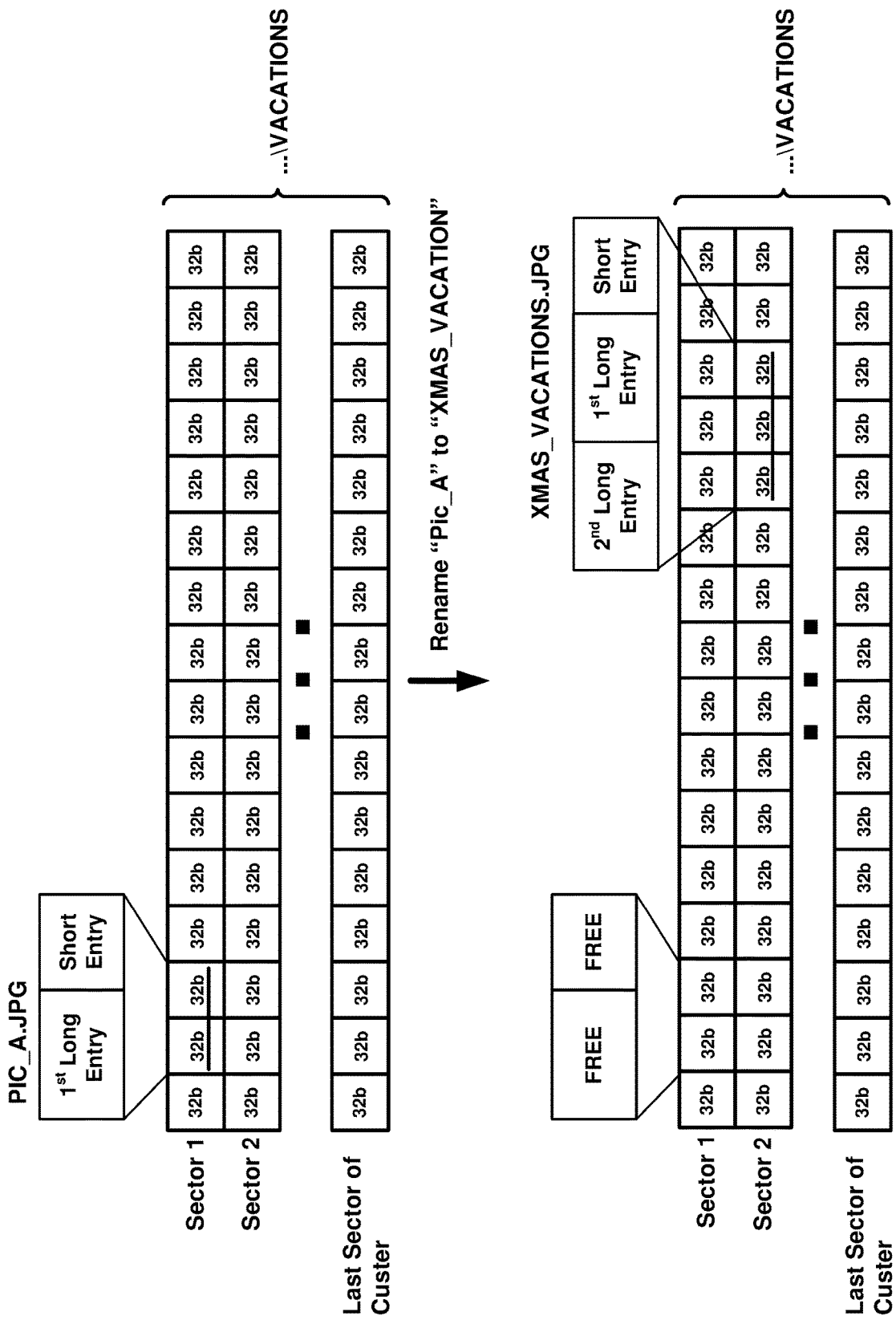
Figure 9:
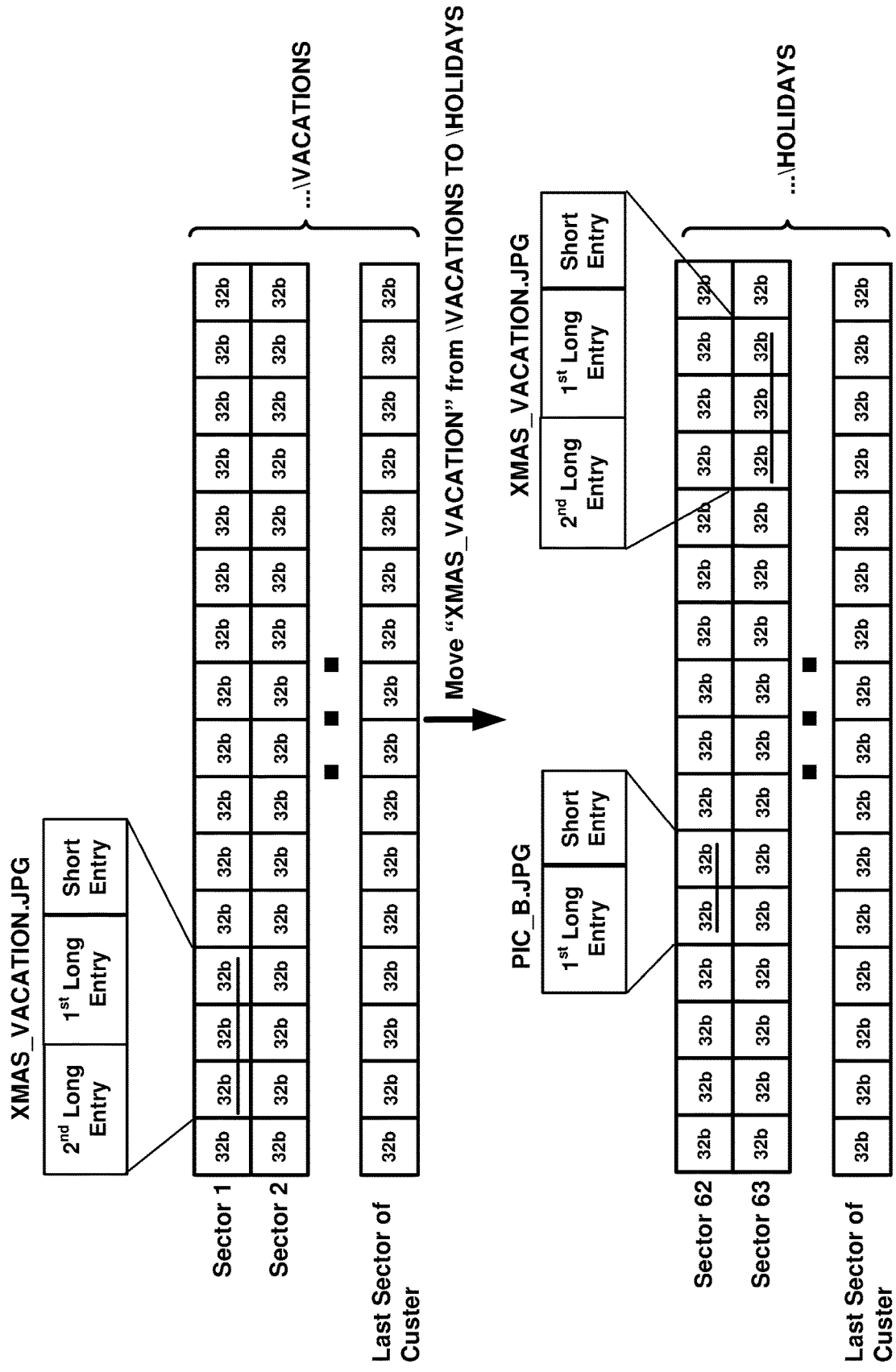
FIG. 9 is a conceptual diagram illustrating an example of renaming a data object according to one or more techniques of this disclosure.

FIGS. 7A-7B illustrate examples of how sectors in a cluster (e.g., a cluster corresponding to a directory table) may be modified when a file is renamed from "PIC_A.JPG" to "XMAS_VACATION.JPG." FIG. 9 illustrates an example of how sectors in clusters may be modified when file "XMAS_VACATION.JPG" is moved from directory "VACATIONS" to directory "HOLIDAYS." In the examples illustrated in FIGS. 7A-7B and FIG. 9, each sector is 512 bytes and logically partitioned into sixteen 32 byte slots. It should be noted that in other examples, other sectors and slot sizes may be used. In the example illustrated in FIG. 7A, an additional long entry is added to a directory table atomically. In the example illustrated in FIG. 7B, an additional long entry is added to a directory table non-atomically. In the example illustrated in FIG. 9, directory entries are added to a directory table non-atomically.

With respect to the examples illustrated in FIGS. 7A-7B, whether the renaming operation can be performed atomically may be based on the availability of slots in a sector. Referring to Sector 1 at the top of FIGS. 7A-7B, the directory entries for "PIC_A.JPG" use slots 1 and 2 of Sector 1 slots 0 to 15. Slots other than slots 1 and 2 (i.e., slots 0 and 3-15) may either be in-use or not in-use (i.e., available or free). As described above with respect to FIGS. 4A-4B, a default value (e.g., E5h) may indicate that a previous directory entry has been deleted and, such that a corresponding slot is available. It should be noted that in some file systems, the default value may be stored as the first byte of a slot. Thus, file system driver 206 may be able to determine if a slot within a sector is available by reading the value of the first byte of a slot. It should be noted that in some file systems, a special default value (e.g., 00h) may indicate that all subsequent slots in a sector, e.g., up to the last sector of a cluster, are available. Thus, in one example, file system driver 206 may determine whether a renaming operation can be performed atomically by reading one or more byte values of slots in a sector. That is, file system driver 206 may read byte values of one or more slots, determine if slots in a sector are available, and determine if the available slots can accommodate additional directory entries.

In the example in FIGS. 7A-7B, in order for the renaming operation to be performed atomically, three available contiguous slots in Sector 1 are required. Thus, file system driver 206 may first determine if either of slot 0 or slot 3, which are adjacent to slots used for the directory entries for "PIC_A.JPG," are available. In the example illustrated in FIG. 7A, file system driver 206 may determine that slot 0 is not available and slot 3 is available. In this case, file system driver 206 may use available slot 3 and slot 1 and slot 2 (i.e., slots used for "PIC_A.JPG" directory entries prior to renaming) in Sector 1 for the directory entries for "XMAS_VACATION.JPG" and as such may perform the renaming operation in an atomic manner, i.e., by overwriting the data in Sector 1. It should be noted, if slots 0 and slot 3 are not available, the renaming operation may be performed atomically if three contiguous slots in Sector 1 are available (e.g., slots 12-14), which may be determined by reading respective byte values (e.g., reading three E5h byte values in contiguous slots or reading one 00h byte value in a slot prior to slot 14). It should be noted that in some examples, file system 206 may be configured to perform renaming operations atomically whenever possible. However, it should be noted that in some examples, although a renaming operation may be performed atomically, file system 206 may be configured to perform the renaming operation non-atomically. For example, file system 206 may determine that only one slot is available in a sector and subsequent renaming operations requiring additional directory entries are likely for a particular data object and, as such, may write the directory entries to a sector including more available slots in order to avoid future non-atomic renaming operations.

In the example illustrated in FIG. 7B, file system driver 206 may determine that the directory entries for "XMAS_VACATION.JPG" are to be written to the slots 11 to 13 in Sector 2 and as such, the renaming operation is to be performed non-atomically (i.e., Sector 1 and Sector 2 require data values to be changed). As illustrated in FIG. 7B, as the end result of the renaming operation, slots 1 and 2 in Sector 1 (i.e., slots used for "PIC_A.JPG" directory entries prior to the renaming operation) will be marked as free (e.g., the first byte value of each slot is changed to E5h). Similarly, referring to FIG. 9, file system driver 206 may determine that the directory entries for "XMAS_VACATION.JPG" are to be written to the slots 12 to 14 in Sector 63 and as such, the renaming operation is performed atomically, where directory entries are to be written to slots 12 to 14 in Sector 63 and slots 1 to 3 in Sector 1 will be marked as free.

As described above, in some cases, a failure during renaming operations may lead to loss of the data object being renamed (or potentially duplication of the data object) which may lead to file system corruption and/or data loss. Referring to FIG. 7B and FIG. 9, each of the renaming operations performed non-atomically require marking slots in an origin sector as free and writing directory entries to slots in a destination sector. In one example, in order to avoid having a volume having two directory entry sets pointing to the same clusters (i.e., effectively cross-linking, which may lead to catastrophic failure of a volume in some cases) in the case of a failure occurring between sector writes, file system driver 206 may be configured to mark slots in the origin sector as free, prior to writing directory entries to slots in the destination sector. In this case, in event of a failure, it is possible that slots in the origin sector are marked as free and directory entries have not been written to slots in the destination sector. Having slots in an origin sector marked as free without having directory entries written to slots in the destination sector may result in the renamed data object being lost completely and its clusters being lost.

In one example, filesystem driver 206 may be configured to journal non-atomic renaming operations. File system 206 may be configured to journal non-atomic renaming operations in a manner that enables file system driver 206 to recover a data object in the event of a failure causing slots in an origin sector to be marked as free without having directory entries written to slots in the destination sector. FIGS. 10A-10B are conceptual diagrams illustrating examples of renaming journals generated according to one or more techniques of this disclosure. The renaming journal illustrated in FIG. 10A corresponds to the example where the renaming operation of renaming "PIC_A.JPG" to "XMAS_VACATION.JPG." is performed atomically as illustrated in FIG. 7A and the renaming journal illustrated in FIG. 10B corresponds to the example where the renaming operation of renaming "PIC_A.JPG" to "XMAS_VACATION.JPG." is performed non-atomically as illustrated in FIG. 7B. In both the examples of FIGS. 10A-10B the renaming operation of moving "XMAS_VACATION.JPG" from directory "VACATIONS" to directory "HOLIDAYS" is performed non-atomically as illustrated in FIG. 9. In this manner, in one example, file system driver 206 may be configured to create journal entries only for renaming operations to be performed in a non-atomic manner.

Referring to FIGS. 10A-10B, each journal entry includes the following: a origin path, an origin sector location, which is specified as an offset slot and a number of slots in the examples of FIGS. 10A-10B, a destination path, a destination sector location, and a flag indicating whether the renaming operation is complete. It should be noted that in other examples, a renaming journal may include additional information, such as, timing data, and the like. Further, in some cases, the format of a renaming journal may be based on a defined journal format of a filesystem. In the examples illustrated in FIGS. 10A-10B, the renaming operation of moving "XMAS_VACATION.JPG" from directory "VACATIONS" to directory "HOLIDAYS" is indicated as not being complete. As described above, file system driver 206 may be configured to mark slots in the origin sector as free, prior to writing directory entries to slots in the destination sector. Thus, each of the journals illustrated in FIGS. 10A-10B, may represent a volume state where during the renaming operation of moving "XMAS_VACATION.JPG" from directory "VACATIONS" to directory "HOLIDAYS," a failure occurred that caused slots 1 to 3 in Sector 1 to be marked as free without the directory entries having been written to slots in 12 to 14 in Sector 63 in the destination sector.

In one example, file system driver 206 may be configured to recover the renaming operation and complete the renaming operation upon a subsequent mounting of a volume. That is, upon a subsequent mounting of a volume, file system driver 206 may read the journal entries, and determine whether renaming operations were completed. For journal entries that indicate that a renaming operation was not completed, file system driver 206 may read the data from the slots in the origin sector, read the data from the slots in the destination sector, and determine whether directory entries have been lost. In the case where data included in directory entries may be recovered, file system driver 206 may complete the renaming operation. For example, in the examples of FIGS. 10A-10B, file system driver 206 may write available directory entries to slots in 12 to 14 in Sector 63 to complete the renaming operation. Further, in the case where data included in directory entries is not able to be recovered, file system driver 206 may attempt to undo the renaming operation. For example, in the examples of FIGS. 10A-10B, file system driver 206 may mark slots 1 to 3 in Sector 1 as in-use and, in some cases, effectively return the volume to a state prior to the attempted failed renaming operation. In this manner, file system driver 206 may be configured to selectively journal particular types of renaming operations and may mitigate potential data loss and/or file system corruption while maintaining acceptable system performance.

It should be noted that although the examples illustrated in FIGS. 10A-10B are described with respect to renaming operations requiring additional directory entries, the techniques described herein may be used for renaming operations reducing the number of required directory entries. For example, a long file name may include directory entries that span two sectors and may be renamed to a shorter name with fewer directory entries that are able to fit within one of the sectors. In this case, file system driver 206 may be configured to write the updated destination sector first (i.e., the resulting single sector) and flush it to disk with a barrier operation. File system driver 206 may then write the updated origin sector afterwards (i.e., the sector with resulting slots marked as free). In this case, if the second write operation (which writes the slots in the origin sector as free) does not occur (e.g., due to a power failure or unplugging), the directory entries corresponding to the partial old long name are left on the slots. It should be noted that leaving directory entries in this case may be inconsequential. That is, when these directory entries are read the next time the volume (or directory) is accessed, they may be deleted. In some cases, such partial names are known as "ghost name entries" and in the FAT file system standard it is specified that such partial names are meaningless and can be ignored. In some examples file system driver 206 may mark slots of ghost name entries as free when it encounters them. In some examples, file system driver 206 may create journal entries for non-atomic renaming operations reducing the number of required directory entries. In some examples, file system driver 206 may not create journal entries for non-atomic renaming operations reducing the number of required directory entries. That is, file system driver 206 may determine whether a failure during a non-atomic renaming operation is likely to be of significant consequence and may selectively journal the operations accordingly.

As described above, a renaming journal may be stored as a file in a volume. In some instances, the volume including the renaming journal may be mounted to a device (e.g., having drivers and/or an operating system) that does not recognize the renaming journal file. In some cases, the device may modify and/or delete the renaming journal file. Referring to FIGS. 10A-10B, example renaming journals include a checksum value. File system driver 206 may be configured to use the checksum value to determine if the renaming journal was modified (e.g., while being mounted to an intermediate device). In one example, file system driver 206 may be configured to ignore a modified renaming journal and clear its contents. In one example, file system driver 206 may be configured to restore a modified renaming journal, if it is attempting to recover a data object, for example. If a renaming journal is deleted, file system driver 206 may simply create a new journal.

Figure 11:
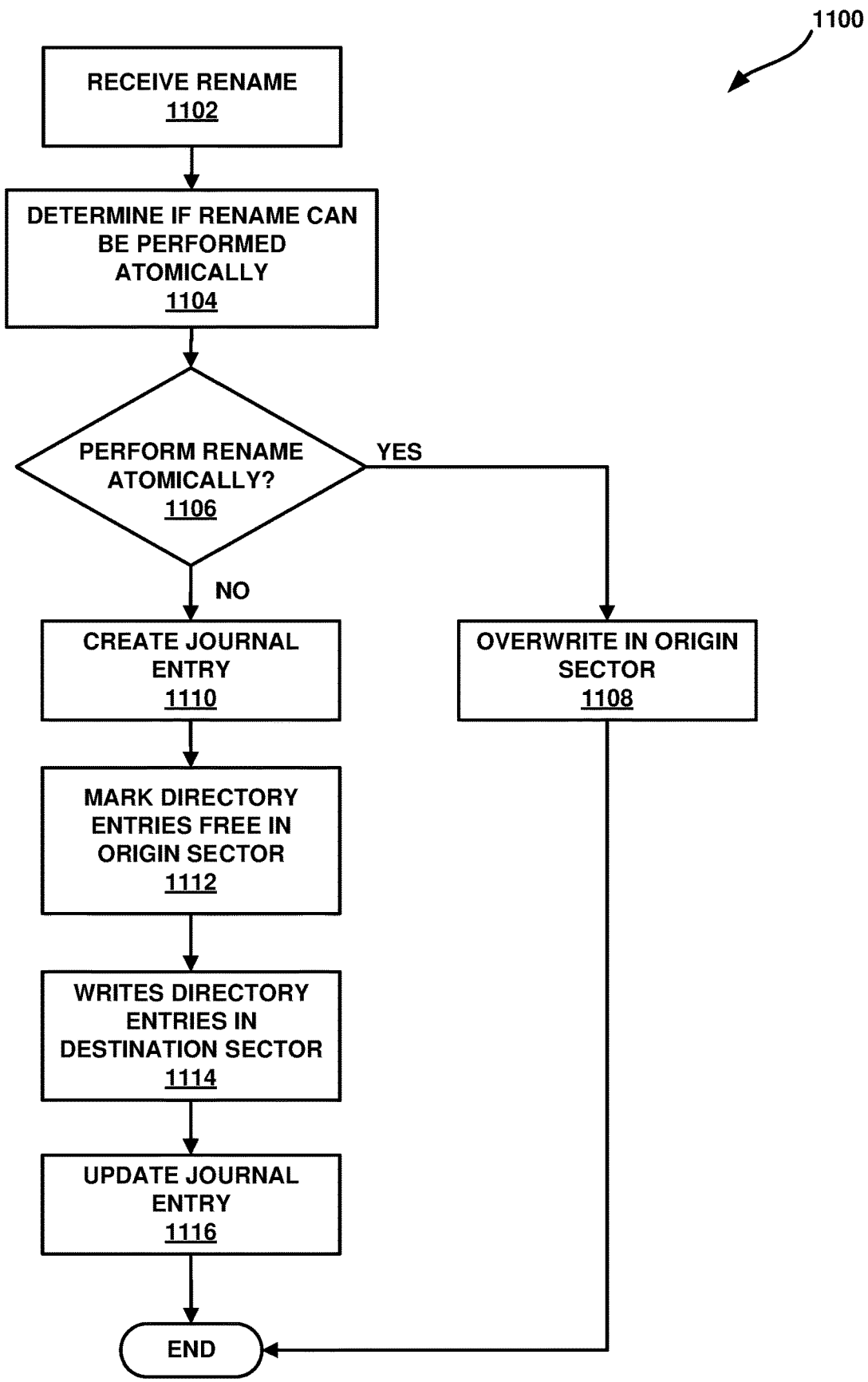
FIG. 11 is a flowchart illustrating an example of renaming data objects according to one or more techniques of this disclosure.

FIG. 11 is a flowchart illustrating an example of renaming data objects according to one or more techniques of this disclosure. It should be noted that although flowchart 1100 is described with respect to file system driver 206, the techniques illustrated in FIG. 11 may be performed by computing device 100 and any combination of components thereof. It should be noted that flowchart 1100 corresponds to non-atomic renaming operations that are determined to be of significant consequence in the event of a failure. That is, renaming operations with respect to FIG. 11 may include those described with respect to FIG. 5 and non-atomic renaming operations reducing the number of required directory entries may be handled according to another process, as described above.

File system driver 206 a receives renaming operation (1102). File system driver 206 determines if the renaming operation can be performed atomically (1104). Determining if the renaming operation can be performed atomically may include reading byte values of slots in a sector, as described above. File system driver 206 determines whether the rename operation is to be performed atomically (1106). As described above, in some cases, a renaming operation that can be performed atomically may not actually be performed atomically, e.g., due to optimizations. Upon determining the rename operation is to be performed atomically, file system driver 206 overwrites data in the origin sector (1108) and completes the renaming operation.

Upon determining the rename operation is to be performed non-atomically, file system driver 206 creates a journal entry (1110). It should be noted that in some cases, creating a journal entry may include creating a journal file. As described above, a journal may include a destination path, a destination sector location, and a flag indicating whether the renaming operation is complete. File system driver 206 marks directory entries in an origin sector as free (1112) and subsequently, writes directory entries in the destination sector (1114). File system driver 206 updates the journal entry to indicate that the renaming operation was completed (1116). Computing device 100 and/or components thereof may perform the techniques described herein in order to allow for more fail-safe operations of a computer readable medium, such as, for example, system memory 104 and/or storage device(s) 118. In this manner computing device 100 represents an example of a device configured to enable fail-safe operations of storage devices.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for renaming a data object, the method comprising:
    receiving a renaming operation, wherein the renaming operation includes modifying directory entries corresponding to the data object, and wherein the renaming operation is able to be performed in an atomic manner by overwriting data only in an origin sector and able to be performed in a non-atomic manner by overwriting data in the origin sector and overwriting data in one or more additional sectors;
    determining whether the renaming operation is to be performed according to one of: the atomic manner or the non-atomic manner, wherein the renaming operation is performed in the non-atomic manner when the origin sector is determined to not include a threshold number of free slots greater than a number of free slots needed to perform the renaming operation in an atomic manner;
    selectively creating a journal entry for the renaming operation based on the determination whether the renaming operation is to be performed according to an atomic manner or a non-atomic manner, wherein a journal entry is created only if the renaming operation is to be performed in a non-atomic manner; and
    performing the renaming operation, and wherein a created journal entry is updated upon completing the renaming operation.

2. The method of claim 1, wherein a created journal entry includes a flag indicating whether the renaming operation is complete.

3. The method of claim 1, wherein a data object includes a file.

4. The method of claim 1, wherein the data object is included in a volume defined according to an exFAT file system.

5. The method of claim 1, wherein the data object is included in a volume defined according to one of a FAT12, FAT16, or FAT32 file system.

6. A device comprising one of more processors configured to:
receive a renaming operation, wherein the renaming operation includes modifying directory entries corresponding to the data object, and wherein the renaming operation is able to be performed in an atomic manner by overwriting data only in an origin sector and able to be performed in a non-atomic manner by overwriting data in the origin sector and overwriting data in one or more additional sectors;
determine whether the renaming operation is to be performed according to one of: the atomic manner or the non-atomic manner, wherein the renaming operation is performed in the non-atomic manner when the origin sector is determined to not include a threshold number of free slots greater than a number of free slots needed to perform the renaming operation in an atomic manner;
selectively create a journal entry for the renaming operation based on the determination whether the renaming operation is to be performed according to an atomic operation or a non-atomic operation, wherein a journal entry is created only if the renaming operation is to be performed in a non-atomic manner; and
perform the renaming operation, and wherein a created journal entry is updated upon completing the renaming operation.

7. The device of claim 6, wherein a created journal entry includes a flag indicating whether the renaming operation is complete.

8. The device of claim 6, wherein the data object is included in a volume defined according to an exFAT file system.

9. The device of claim 6, wherein the data object is included in a volume defined according to one of a FAT12, FAT16, or FAT32 file system.

10. A non-transitory computer-readable storage medium comprising instructions stored thereon, that upon execution, cause one or more processors of a device to:
receive a renaming operation, wherein the renaming operation includes modifying directory entries corresponding to the data object, and wherein the renaming operation is able to be performed in an atomic manner by overwriting data only in an origin sector and able to be performed in a non-atomic manner by overwriting data in the origin sector and overwriting data in one or more additional sectors;
determine whether the renaming operation is to be performed according to one of: the atomic manner or the non-atomic manner, wherein the renaming operation is performed in the non-atomic manner when the origin sector is determined to not include a threshold number of free slots greater than a number of free slots needed to perform the renaming operation in an atomic manner;
selectively create a journal entry for the renaming operation based on the determination whether the renaming operation is to be performed according to an atomic operation or a non-atomic operation, wherein a journal entry is created only if the renaming operation is to be performed in a non-atomic manner; and
perform the renaming operation, and wherein a created journal entry is updated upon completing the renaming operation.

11. The non-transitory computer-readable storage medium of claim 10, wherein a created includes a flag indicating whether the renaming operation is complete.

12. The non-transitory computer-readable storage medium of claim 10, wherein the data object is a file included in a volume defined according to one of a FAT12, FAT16, or FAT32 file system.

13. The method of claim 1, wherein performing the renaming operation, according to a non-atomic operation includes marking directory entries in the origin sector as free and subsequently writing directory entries in a destination sector.

14. The method of claim 2, wherein a created journal entry further includes an origin sector location and a destination sector location.

15. The device of claim 6, wherein performing the renaming operation, according to a non-atomic operation includes marking directory entries in the origin sector as free and subsequently writing directory entries in a destination sector.

16. The device of claim 7, wherein a created journal entry further includes an origin sector location and a destination sector location.

17. The non-transitory computer-readable storage medium of claim 10, wherein performing the renaming operation, according to a non-atomic operation includes marking directory entries in the origin sector as free and subsequently writing directory entries in a destination sector.

18. The method of claim 1, wherein each sector is 512 bytes and logically partitioned into sixteen 32 byte slots.

19. The device of claim 6, wherein each sector is 512 bytes and logically partitioned into sixteen 32 byte slots.

20. The non-transitory computer-readable storage medium of claim 10, wherein each sector is 512 bytes and logically partitioned into sixteen 32 byte slots.

* * * * *